United States Patent
Lehr et al.

(10) Patent No.: US 8,443,228 B2
(45) Date of Patent: *May 14, 2013

(54) TRANSITIONAL REPLACEMENT OF OPERATIONS PERFORMED BY A CENTRAL HUB

(75) Inventors: Douglas Lee Lehr, Austin, TX (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,992

(22) Filed: Jun. 29, 2011

(65) Prior Publication Data
US 2011/0258485 A1    Oct. 20, 2011

Related U.S. Application Data

(63) Continuation of application No. 12/180,363, filed on Jul. 25, 2008, now Pat. No. 8,010,832.

(51) Int. Cl.
*G06F 11/00* (2006.01)

(52) U.S. Cl.
USPC .......................... 714/4.12; 714/11

(58) Field of Classification Search .......... None
See application file for complete search history.

(56) References Cited

U.S. PATENT DOCUMENTS

| | | | |
|---|---|---|---|
| 5,940,826 A | 8/1999 | Heideman et al. | |
| 6,681,339 B2 | 1/2004 | McKean et al. | |
| 7,100,076 B2 | 8/2006 | Johnson et al. | |
| 7,366,765 B1 | 4/2008 | Heideman et al. | |
| 7,426,653 B2 | 9/2008 | Hu et al. | |
| 7,590,898 B2 | 9/2009 | Coekaerts | |
| 2003/0167420 A1 | 9/2003 | Parsons | |
| 2004/0133652 A1* | 7/2004 | Miloushev et al. | 709/214 |
| 2004/0268062 A1 | 12/2004 | Ofer | |
| 2005/0022047 A1 | 1/2005 | Chandrasekaran | |

(Continued)

OTHER PUBLICATIONS

First Office Action dated Sep. 8, 2010, pp. 1-9, for U.S. Appl. No. 12/180,363 by inventors D.L. Lehr, et al.

(Continued)

*Primary Examiner* — Yolanda L Wilson
(74) *Attorney, Agent, or Firm* — Rabindranath Dutta; Konrad Raynes Davda & Victor LLP

(57) ABSTRACT

A central hub is coupled to a plurality of computational devices. The central hub stores a data structure that grants locks for accessing common data stored at the central hub, wherein the common data is shared by the plurality of computational devices. Each computational device maintains locally those locks that are held by the computational device in the data structure stored at the central hub. In response to a failure of the data structure stored at the central hub, a selected computational device of the plurality of computational devices is determined to be a manager system. Other computational devices besides the manager system communicate to the manager system all locks held by the other computational devices in the data structure stored at the central hub. The data structure and the common data are generated and stored at the manager system. Transactions are performed with respect to the data structure stored at the manager system, until the data structure stored at the central hub is operational.

12 Claims, 8 Drawing Sheets

U.S. PATENT DOCUMENTS

2006/0143511 A1 6/2006 Huemiller, Jr.
2008/0082761 A1 4/2008 Herness et al.
2010/0023803 A1 1/2010 Lehr et al.

OTHER PUBLICATIONS

Response dated Dec. 8, 2010, pp. 1-18 to First Office Action dated Sep. 8, 2010, pp. 1-9, for U.S. Appl. No. 12/180,363 by inventors D.L. Lehr, et al.

Final Office Action dated Feb. 17, 2011, pp. 1-5, for U.S. Appl. No. 12/180,363 by inventors D.L. Lehr, et al.

Response dated Apr. 15, 2011, pp. 1-14, to Final Office Action dated Feb. 17, 2011, pp. 1-5, for U.S. Appl. No. 12/180,363 by inventors D.L. Lehr, et al.

Notice of Allowance dated Apr. 29, 2011, pp. 1-9, for U.S. Appl. No. 12/180,363 by inventors D.L. Lehr, et al.

* cited by examiner

TRANSITIONAL REPLACEMENT OF OPERATIONS PERFORMED BY A CENTRAL HUB

CROSS-REFERENCE TO RELATED APPLICATIONS

This application is a continuation of application Ser. No. 12/180,363 filed on Jul. 25, 2008, which is incorporated herein by reference in its entirety.

BACKGROUND

1. Field

The disclosure relates to a method, system, and article of manufacture for the transitional replacement of operations performed by a central hub.

2. Background

In certain data centers, systems may have to keep executing properly in various failure scenarios. In order to accommodate such requirements, software that utilizes a parallel sysplex mode of communication may be used. Data centers that employ such software may allow one system to fail without affecting the overall workload. As a result, a system is prevented from being a single point of failure.

The software may use a central hub, in order to keep all the systems synchronized, wherein the central hub maintains common data that is available to all the systems. For example, in z/OS™ the coupling facility acts as the central hub. However, if the central hub becomes non-operational, the other systems may also become non-operational.

SUMMARY OF THE PREFERRED EMBODIMENTS

Provided are a method, a system, an article of manufacture, and a method for deploying computing infrastructure, wherein a central hub is coupled to a plurality of computational devices. The central hub stores a data structure that grants locks for accessing common data stored at the central hub, wherein the common data is shared by the plurality of computational devices. Each computational device maintains locally those locks that are held by the computational device in the data structure stored at the central hub. In response to a failure of the data structure stored at the central hub, a selected computational device of the plurality of computational devices is determined to be a manager system. Other computational devices besides the manager system communicate to the manager system all locks held by the other computational devices in the data structure stored at the central hub. The data structure and the common data are generated and stored at the manager system. Transactions are performed with respect to the data structure stored at the manager system, until the data structure stored at the central hub is operational.

In additional embodiments, the central hub is a coupling facility, wherein the data structure is a lock structure, wherein the central hub while operational is able to communicate faster than the manager system to the other computational devices, wherein the plurality of computational devices are numbered sequentially with ordinal numbers at initialization time, and wherein determining the manager system further comprises determining which operational computational device of the plurality of computational devices has been numbered with a least ordinal number, and selecting the manager system to be the operational computational device that has been numbered with the least ordinal number.

In yet additional embodiments, one computational device of the plurality of computational devices requests a new lock from the central hub. The new lock is stored in the data structure by the central hub, in response to the new lock being granted by the central hub. The new lock is stored locally in the one computational device, in response to the new lock being granted by the central hub.

In further embodiments, the communicating to the manager system, by the other computational devices besides the manager system, of all the locks held by the other computational devices in the data structure stored at the central hub, is performed by using a control dataset stored in a direct access storage device (DASD) system that is accessible by the plurality of computational devices. A determination is made that the data structure stored in the central hub is operational once again. The manager system relinquishes responsibilities for maintaining the lock structure to the central hub.

In yet further embodiments, the communicating to the manager system, by the other computational devices besides the manager system, of all the locks held by the other computational devices in the data structure stored at the central hub, is performed via a channel to channel connection.

BRIEF DESCRIPTION OF THE DRAWINGS

Referring now to the drawings in which like reference numbers represent corresponding parts throughout.

DETAILED DESCRIPTION

Figure 1:
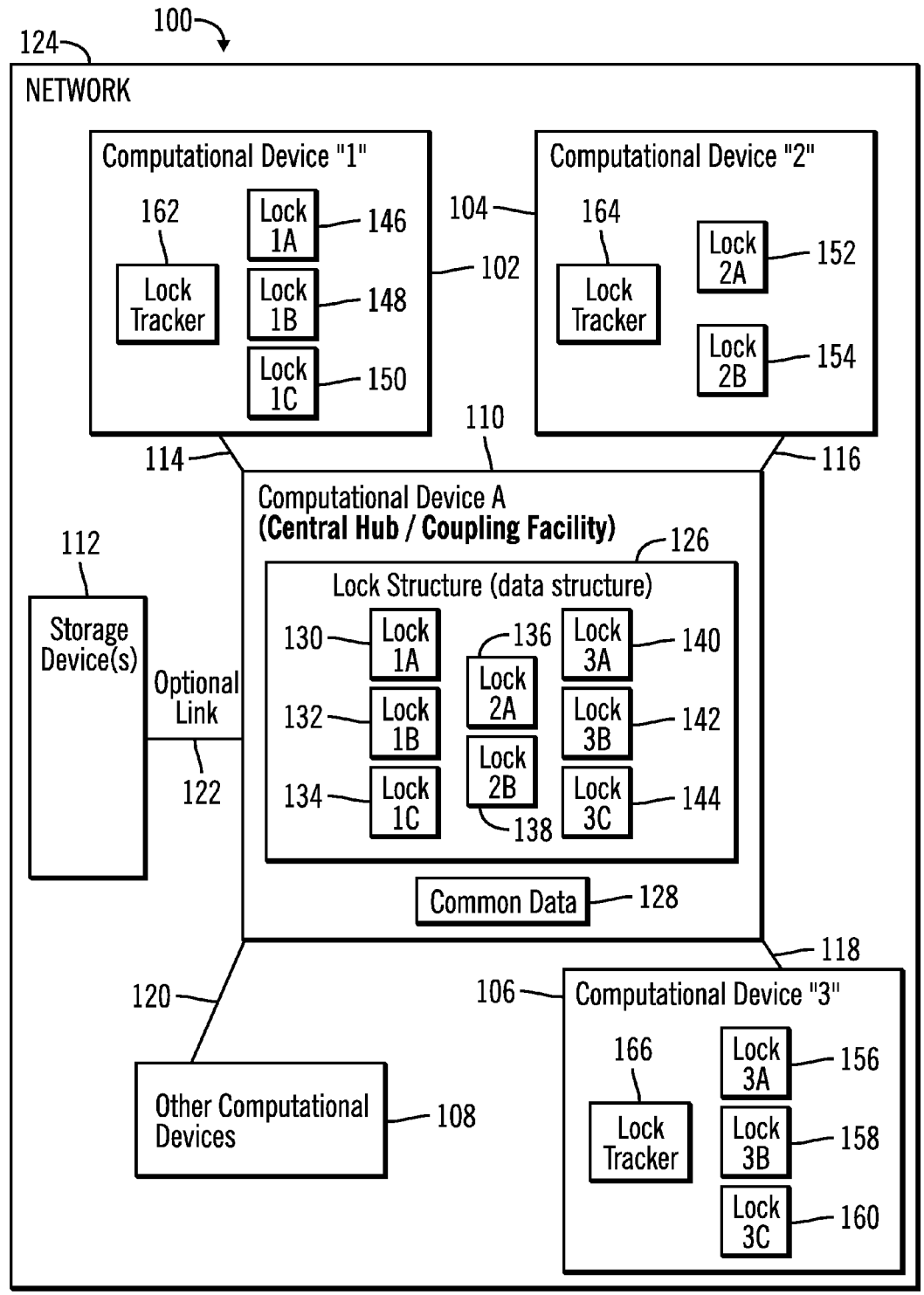
FIG. 1 illustrates a block diagram of a computing environment in which a plurality of computational devices is coupled to central hub, in accordance with certain embodiments.

In the following description, reference is made to the accompanying drawings which form a part hereof and which illustrate several embodiments. It is understood that other embodiments may be utilized and structural and operational changes may be made.

Central Hub Based Computing Systems

In certain embodiments a plurality of systems are coupled to a central hub, wherein all of the plurality of systems are able to handle a failure scenario that involves the central hub.

In certain embodiments, the central hub is augmented with a lock structure. Each system of the plurality of systems keeps track of the locks the system holds with the lock structure. In the event of a failure of the lock structure, information on all locks being held is known. However, the information is scattered across the plurality of systems. In certain embodiments, at the time of failure of the lock structure and/or the central hub, one system is designated to be in charge of all of the locks, and all requests are sent to this system, until the time the lock structure and/or the central hub is rebuilt.

In certain embodiments, each system that uses the lock structure keeps track of the locks held in the lock structure. In certain embodiments, a system may commence tracking a lock in the lock structure when the system requests a lock from the lock structure.

Once a lock structure failure is detected either because of a failure of the central hub or because of an error in the lock structure itself, a system has to be chosen to manage all the locks used in the lock structure of the central hub. This may be performed by assigning each system an ordinal number at initialization time, and the system with ordinal number corresponding to '1' may assume the locking responsibilities of the central hub. In certain embodiments, if the system with ordinal number corresponding to '1' is not available, then the system with ordinal number corresponding to '2' may assume the responsibilities of the central hub, and if the system with ordinal number corresponding to '2' is not available then the system with ordinal number corresponding to '3' may assume the responsibilities of the central hub. Thus, the system with the least ordinal number assumes the responsibilities of the central hub. The system that assumes the responsibilities of the central hub may be referred to as the manager system.

In response to a system being assigned to be the manager system of the locks, all other systems may send all of their currently held locks to this manager system. This can be achieved either by using an already existing Channel to Channel (CTC) connection or through a control dataset that resides on a direct assess storage device (DASD) that is accessible to all systems. It is preferable to send the currently held locks via a CTC connection since it is sent directly and it does not require input/output (I/O) operations, whereas a control dataset may take more time to process all the locks and allow the movement of all the locks to the manager system.

Once all currently held locks are sent to the manager system, normal transactions can resume once again, with the exception that all requests are now sent to the manager system instead being sent to the central hub. The manager system continues to manage lock contention as needed, until the lock structure in the central hub is operational once again. When the lock structure is operational, the manager system may send a request back to the remaining systems signaling that the lock structure in the central hub is operational. Each system may then repopulate the lock structure in the central hub with the locks maintained on each system, Certain embodiments allow transactions to continue in the event of a lock structure failure. There may be a performance impact since the transfer of data between systems may be slower in comparison to the scenario in which the lock structure at the central hub is used. However, there is a reduction in the down time during the failure of the lock structure and critical transactions may be allowed to be completed while the non-operational lock structure is being rebuilt.

Exemplary Embodiments

FIG. 1 illustrates a block diagram of a computing environment 100 in which a plurality of computational devices 102, 104, 106, 108 are coupled to central hub 110, in accordance with certain embodiments. The computational devices 102, 104, 106, 108 and the central hub 110 may comprise any suitable computational device known in the art, such as, a personal computer, a mainframe computer, a midrange computer, a storage controller, a library manager, a telephony device, a handheld computer, etc. The central hub 110 may also be referred to as a coupling facility. One or more storage devices 112 may also be optionally coupled to the central hub 110.

In FIG. 1 the coupling of the computational devices 102, 104, 106, 108 and the storage devices 112 to the central hub 110 is via the direct connections 114, 116, 118, 120, 122. In addition to the direct connections 114, 116, 118, 120, 122, the computational devices 102, 104, 106, 108, the central hub 110, and the storage devices 112 may communicate over a network 124. Communications that take place over the network 124 are slower in comparison to communications that take place over the direct connections 114, 116, 118, 120, 122 to the central hub 110.

The central hub 110 maintains a data structure 126 referred to as a lock structure. The central hub 110 also maintains common data 128 that is shared by the computational devices 102, 104, 106, 108. The central hub 110 provides access to the common data 128 to the computational devices 102, 104, 106, 108 by granting locks requested by the computational devices 102, 104, 106, 108. The granted locks are stored in the lock structure 126 at the central hub 110.

FIG. 1 shows locks 1A, 1B, 1C (reference numerals 130, 132, 134) stored in the lock structure 126, wherein locks 1A, 1B, 1C (reference numerals 130, 132, 134) have been requested and are held by the computational device 102. FIG. 1 also shows locks 2A, 2B (reference numerals 136, 138) stored in the lock structure 126, wherein locks 2A, 2B (reference numerals 136, 138) have been requested and are held by the computational device 104. Additionally, FIG. 1 shows locks 3A, 3B, 3C (reference numerals 140. 142, 144) stored in the lock structure 126, wherein locks 3A, 3B, 3C (reference numerals 140. 142, 144) have been requested and are held by the computational device 106.

In certain embodiments, each of the computational devices 102, 104, 106, 108 stores a local copy of the locks that the computational device has obtained from the central hub 110. For example, computational device 102 is shown to store local copies of locks 1A, 1B, 1C (reference numeral 146, 148, 150), computational device 104 is shown to store local copies of locks 2A, 2B (reference numerals 152, 154), and computational device 106 is shown to store local copies of locks 3A, 3B, 3C (reference numerals 156, 158, 160). Exemplary lock tracker applications 162, 164, 166 may manage the locks that are locally stored at the computational devices 102, 104, 106, 108.

Therefore, FIG. 1 illustrates certain embodiments in which a central hub 110 facilitates a redundant computing environment in which the failure of any one of the computational devices 102, 104, 106, 108 does not cause executing applications to be terminated. The central hub 110 coordinates the processing operations of the computational devices 102, 104, 106, 108 via the common data 128 and the locks maintained in the lock structure 126 on the common data 128. In the event of a failure of any of the computational devices 102, 104, 106, 108, processing is taken over by one or more operational computational devices under the control of the central hub 110.

Figure 2:
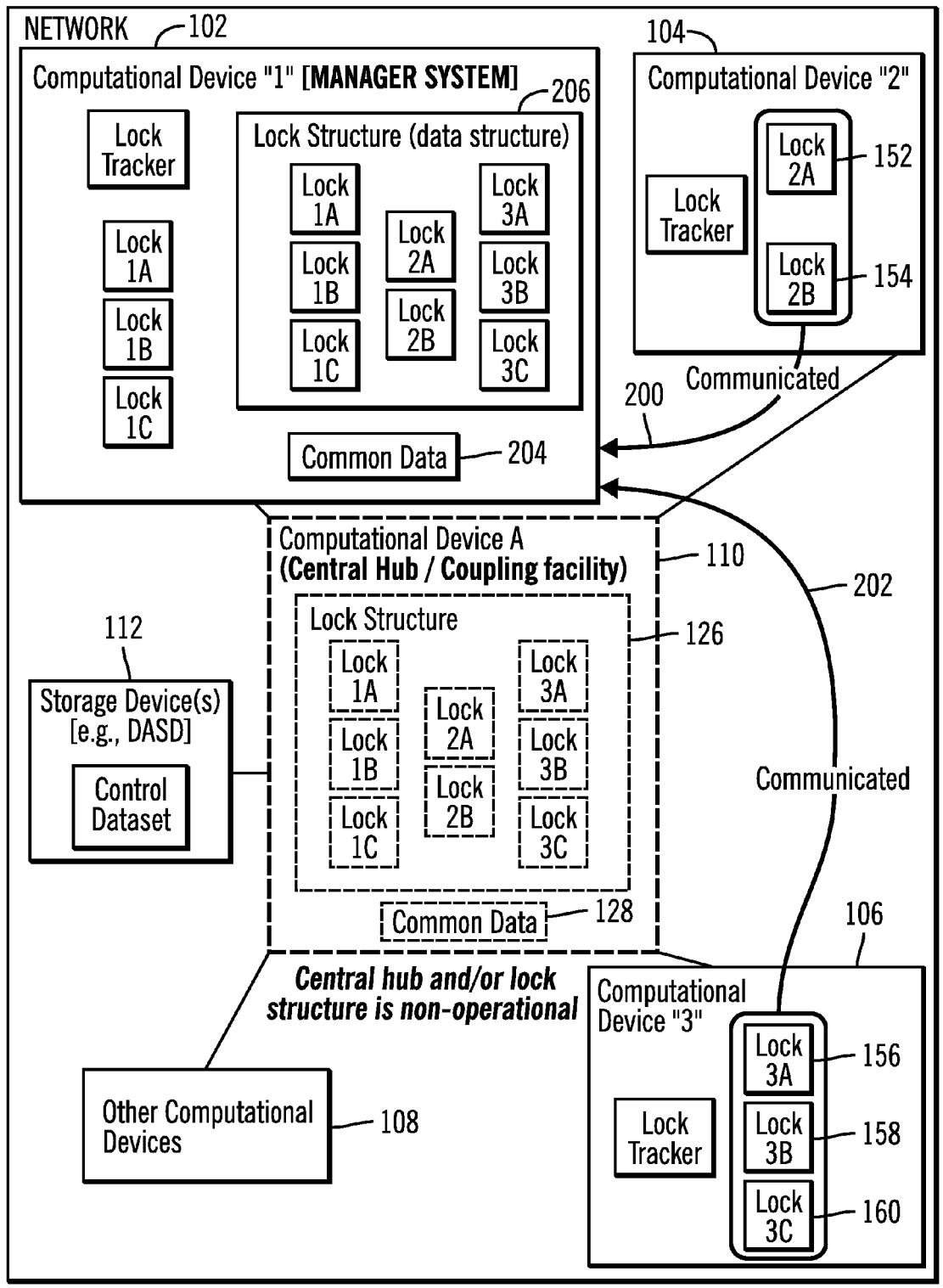
FIG. 2 shows a block diagram that indicates the failure of the central hub and the assumption of certain responsibilities of the central hub by a manager system selected from the plurality of computational devices, in accordance with certain embodiments.

FIG. 2 shows a block diagram that indicates the failure of the central hub 110 and/or a failure of the lock structure 126 and the assumption of certain responsibilities of the central hub 110 by a manager system 102 selected from the plurality of computational devices 102, 104, 106, 108, in accordance with certain embodiments.

In the event of a failure of the central hub 110, a manager system 102 is selected from the plurality of computational devices 102, 104, 106, 108. The manager system 102 may temporarily assume certain functions of the central hub 110, such that applications are not terminated. Once the central hub 110 is operational, the manager system 102 may transfer responsibilities back to the central hub 110.

When the manager system 102 takes over the responsibilities of the central hub 110, the other computational devices 104, 106, 108 communicate the locks held at the lock structure 126 to the manager system 102. For example, the two arrows 200, 202 (shown in FIG. 2) indicate that the computational devices 104, 106 communicate locks to the manager system 102. Locks 2A, 2B (reference numerals 152, 154) stored locally at the computational device 104 are communicated by the computational device 104 to the manager system 102, and locks 3A, 3B, 3C (reference numerals 156, 158, 160) stored locally at the computational device 106 are communicated by the computational device 106 to the manager system 102.

On receiving the locks from the computational devices 104, 106, the manager system 102 recreates the common data 128 and the lock structure 126 at the manager system 102, wherein reference numerals 204 and 206 show the recreated common data and the lock structure respectively in the manager system 102. The recreated lock structure 206 and the recreated common data 204 are used by the manager system 102 to coordinate the processing in the computational devices 104, 106, 108, in the event of a failure of the lock structure 126 or the central hub 110.

Figure 3:
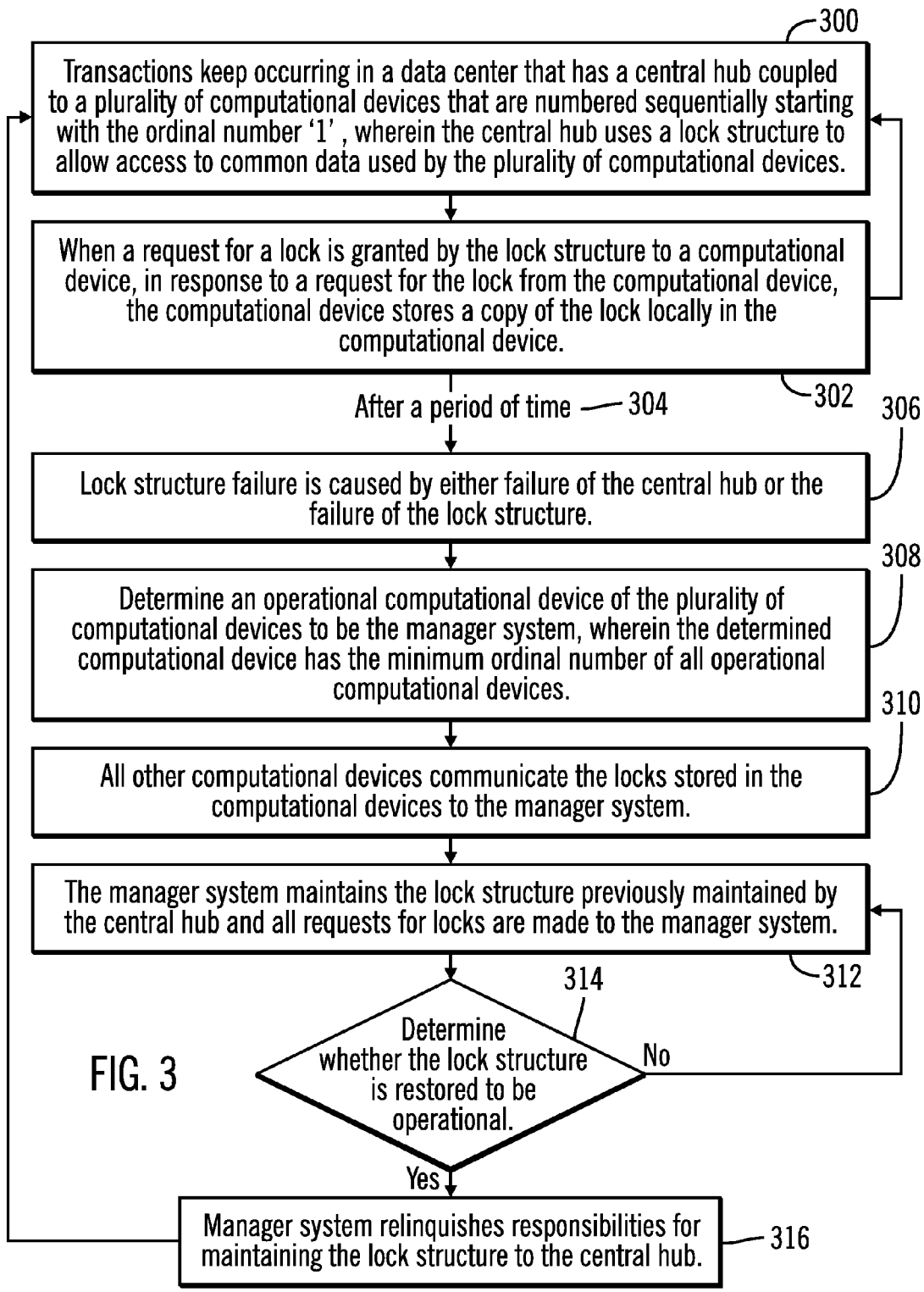
FIG. 3 illustrates a flowchart that shows first operations, in accordance with certain embodiments.

FIG. 3 illustrates a flowchart that shows first operations, in accordance with certain embodiments. In certain embodiments, the first operations shown in FIG. 3 may be implemented in a data center comprising the computational devices 102, 104, 106, 108, the central hub 110, and the storage devices 112 that operate in the network 124 in association with the direct connections 114, 116, 118, 120, 122.

Control starts at block 300 in which transactions keep occurring in a data center that has a central hub 110 coupled to a plurality of computational devices 102, 104, 106, 108 that are numbered sequentially starting with the ordinal number '1' (e.g. computational device '1' with reference numeral 102 in FIG. 1, computational device '2' with reference numeral 104 in FIG. 1, computational device '3' with reference numeral 106 in FIG. 1), wherein the central hub 110 uses a lock structure 126 to allow access to common data 128 used by the plurality of computational devices 102, 104, 106, 108.

When a request for a lock is granted by the lock structure 126 to a computational device, in response to a request for the lock from the computational device, the computational device stores (at block 302) a copy of the lock locally in the computational device. After a period of time (reference numeral 304), control proceeds to block 306 in which a lock structure failure is caused by either a failure of the central hub 110 or a failure of the lock structure 126.

Control proceeds to block 308, wherein a determination is made of an operational computational device of the plurality of computational devices 102, 104, 106, 108 that is to be the manager system (reference numeral 102 in FIG. 2 that corresponds to computational device '1'), wherein the determined computational device has the minimum ordinal number (e.g., computational device '1') of all operational computational devices. If computational device '1' (reference numeral 102) is not operational, then computational device '2' (reference numeral 104) may be chosen as the manager system.

All other computational devices communicate (at block 310) the locks stored in the computational devices to the manager system 102. The manager system 102 maintains (at block 312) the lock structure previously maintained by the central hub 110 and all requests for locks are made to the manager system 102. A determination is made (at block 314) as to whether the failed lock structure 126 is restored to be operational. If so, then the manager system 102 relinquishes (at block 316) responsibilities for maintaining the lock structure to the central hub 110 and control returns to block 300. If not, control returns to block 312.

Figure 4:
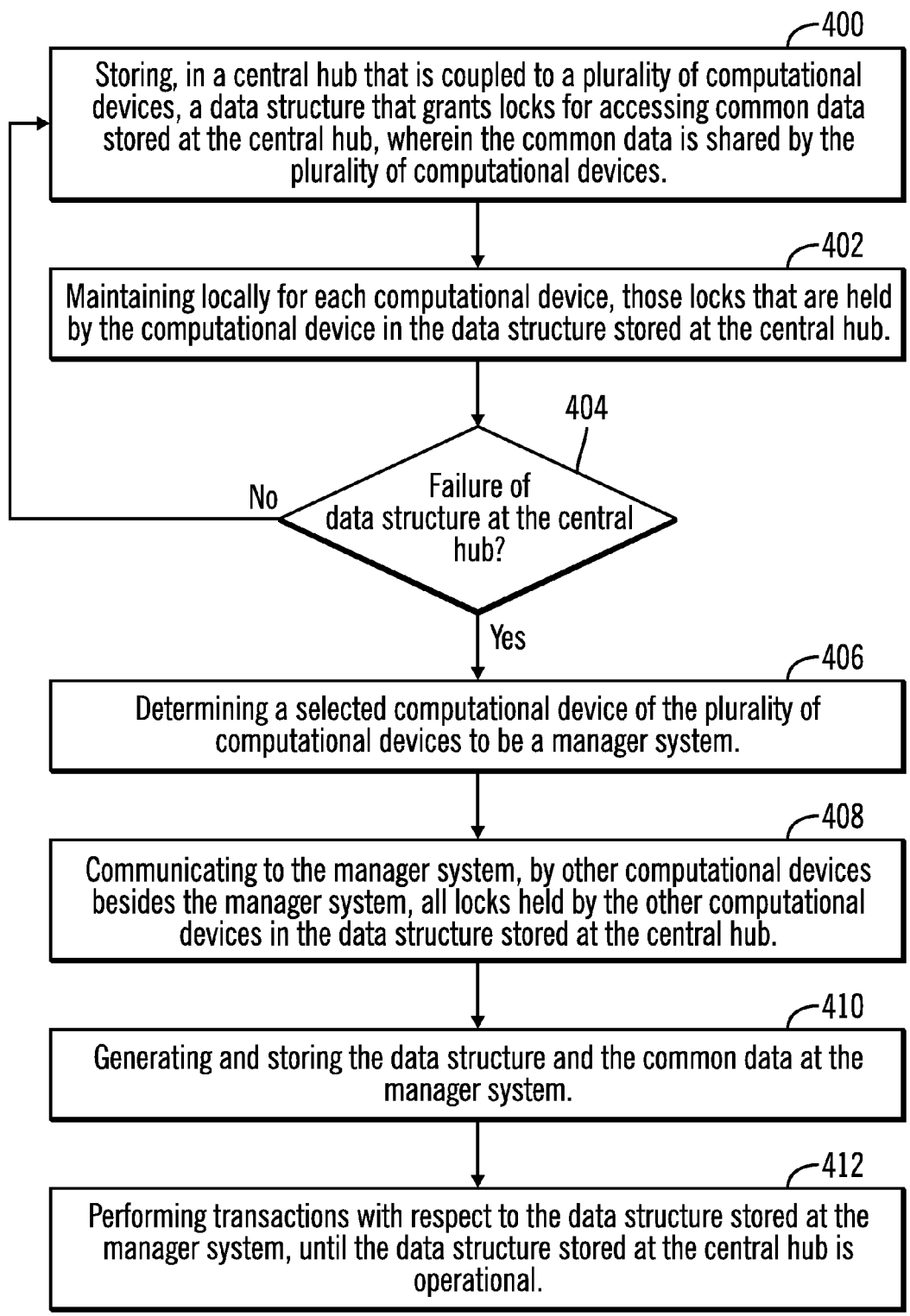
FIG. 4 illustrates a flowchart that shows second operations, in accordance with certain embodiments.

FIG. 4 illustrates a flowchart that shows second operations, in accordance with certain embodiments. In certain embodiments, the second operations shown in FIG. 4 may be implemented in a data center comprising the computational devices 102, 104, 106, 108, the central hub 110, and the storage devices 112 that operate in the network 124 in association with the direct connections 114, 116, 118, 120, 122.

A central hub 110 that is coupled to a plurality of computational devices 102, 104, 106, 108 stores (at block 400) a data structure 126 (e.g., the lock structure) that grants locks for accessing common data 128 stored at the central hub 110, wherein the common data 128 is shared by the plurality of computational devices 102, 104, 106, 108.

Each computational device maintains (at block 402) locally those locks that are held by the computational device in the data structure 126 stored at the central hub 110. In response to a failure of the data structure 126 maintained at the central hub 110 (at block 404), a selected computational device 102 of the plurality of computational devices 102, 104, 106, 108 is determined (at block 406) to be a manager system 102.

A communication is performed (at block 408) to the manager system 102, by other computational devices 104, 106, 108 besides the manager system 102, of all locks held by the other computational devices 104, 106, 108 in the data structure 126 stored at the central hub 110. The data structure and the common data are generated and stored (at block 410) at the manager system 102. Transactions are performed (at block 412) with respect to the data structure (reference numeral 206 of FIG. 2) stored at the manager system 102, until the data structure (reference numeral 126) stored at the central hub 110 is operational.

If there is no failure of the data structure 126 at the central hub 110 control returns to block 400 from block 404.

Figure 5:
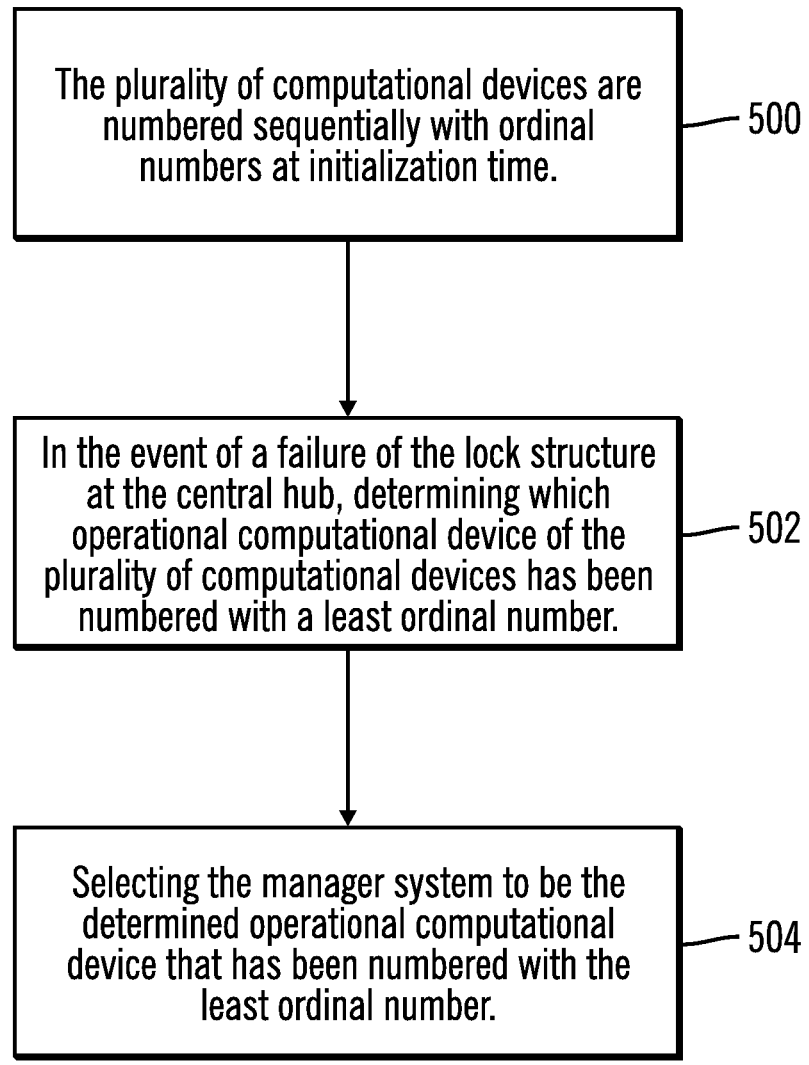
FIG. 5 illustrates a flowchart that shows third operations, in accordance with certain embodiments.

FIG. 5 illustrates a flowchart that shows third operations, in accordance with certain embodiments. In certain embodiments, the third operations shown in FIG. 5 may be implemented in a data center comprising the computational devices 102, 104, 106, 108, the central hub 110, and the storage devices 112 that operate in the network 124 in association with the direct connections 114, 116, 118, 120, 122.

Control starts at block 500 in which the plurality of computational devices 102, 104, 106, 108 are numbered sequentially with ordinal numbers (e.g., computational devices '1', '2', '3', etc., shown via reference numerals 102, 104, 106 in FIGS. 1 and 2) at initialization time.

In the event of a failure of the lock structure 126 at the central hub 110, a determination is made (at block 502) as to which operational computational device of the plurality of computational devices has been numbered with a least ordinal number. Control proceeds to block 504, wherein the manager system 102 is selected to be the operational computational device that has been numbered with the least ordinal number (e.g. computational device '1' with reference numeral 102 in FIG. 2).

Therefore, the operations shown in FIG. 5 determine how a manager system is selected from the computational devices 102, 104, 106, 108.

Figure 6:
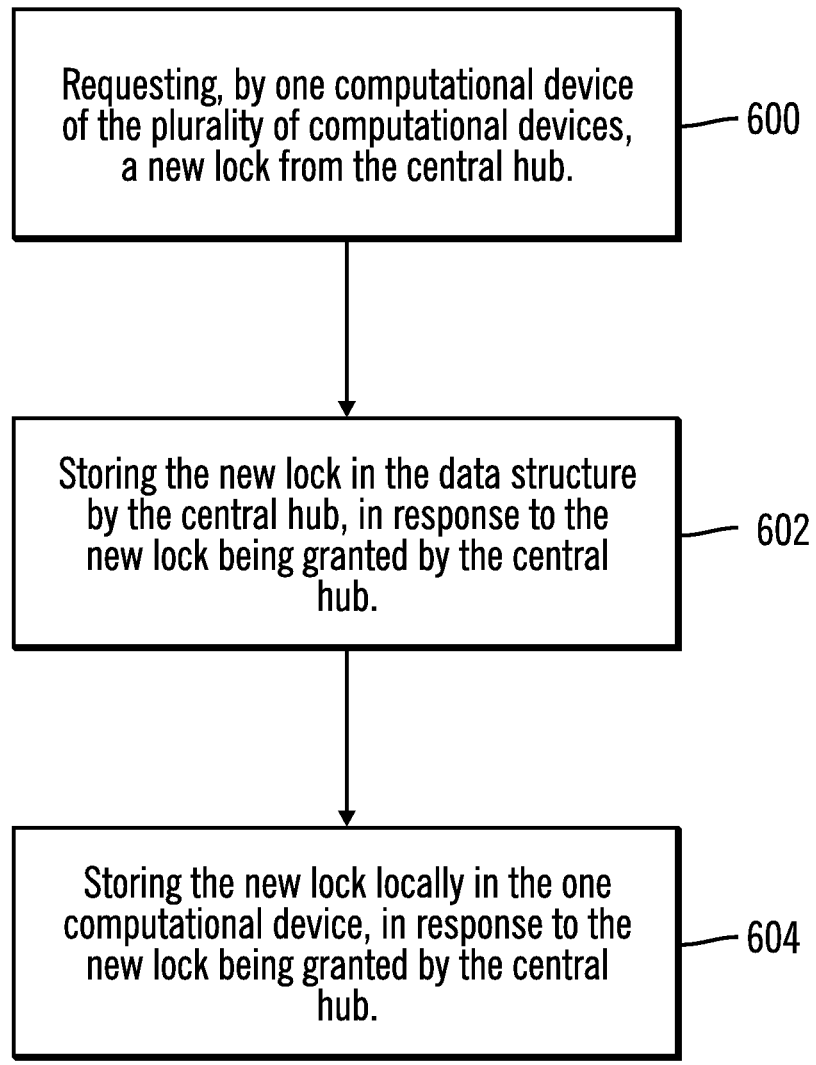
FIG. 6 illustrates a flowchart that shows fourth operations, in accordance with certain embodiments.

FIG. 6 illustrates a flowchart that shows fourth operations, in accordance with certain embodiments. In certain embodiments, the fourth operations shown in FIG. 6 may be implemented in a data center comprising the computational devices 102, 104, 106, 108, the central hub 110, and the storage devices 112 that operate in the network 124 in association with the direct connections 114, 116, 118, 120, 122.

At block 600, one computational device of the plurality of computational devices 102, 104, 106, 108 requests a new lock from the central hub 110. The new lock is stored (at block 602) in the data structure 126 by the central hub 110, in response to the new lock being granted by the central hub 110. The new lock is also stored (at block 504) locally in the one computational device, in response to the new lock being granted by the central hub.

Therefore, FIG. 6 illustrates certain embodiments in which new locks are requested and granted.

Figure 7:
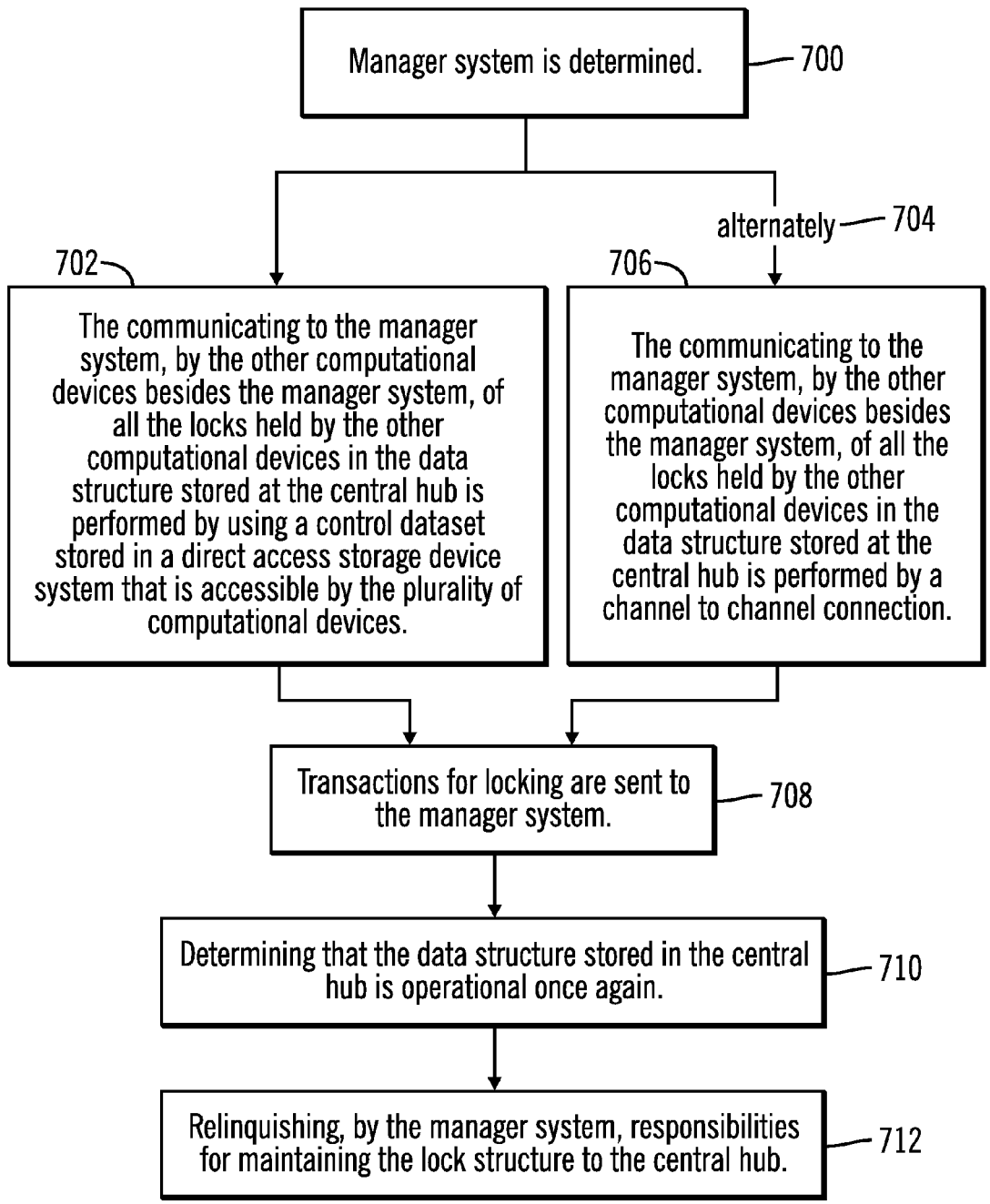
FIG. 7 illustrates a flowchart that shows fifth operations, in accordance with certain embodiments.

FIG. 7 illustrates a flowchart that shows fifth operations, in accordance with certain embodiments. In certain embodiments, the fifth operations shown in FIG. 7 may be implemented in a data center comprising the computational devices 102, 104, 106, 108, the central hub 110, and the storage devices 112 that operate in the network 124 in association with the direct connections 114, 116, 118, 120, 122.

Control starts at block 700 in which a manager system 102 is determined. From block 700 control proceeds to block 702 or alternately (reference numeral 704) to block 706.

At block 702, a communication is performed to the manager system 102, by the other computational devices 104, 106, 108 besides the manager system 102, of all the locks held by the other computational devices 104, 106, 108 in the data structure 126 stored at the central hub 110. The communication may be performed by using a control dataset 208 (shown in FIG. 2) stored in a direct access storage device system 112 that is accessible to the plurality of computational devices 102, 104, 106, 108.

Block 706 shows that the communicating to the manager system 102, by the other computational devices 104, 106, 108 besides the manager system 102, of all the locks held by the other computational devices 104, 106, 108 in the data structure 126 stored at the central hub 110, is performed via a channel to channel connection. The channel to channel connection is relatively faster in comparison to communications performed via the control dataset 208.

From blocks 702 and 706, control proceeds to block 708 in which transactions for locking are sent to the manager system 102. A determination is made (at block 710) that the data structure 126 stored in the central hub 110 is operational once again. The manager system 102 relinquishes (at block 712), responsibilities for maintaining the lock structure to the central hub 110.

Therefore, FIG. 1-7 illustrates certain embodiments in which a manager system 102 takes over the responsibilities of a central hub 110, in response to a failure of a lock structure 126 maintained within the central hub 110. The lock structure is recreated at the manager system 102 via copies of locks maintained at other computational devices that held the locks at the non-operational lock structure 126.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
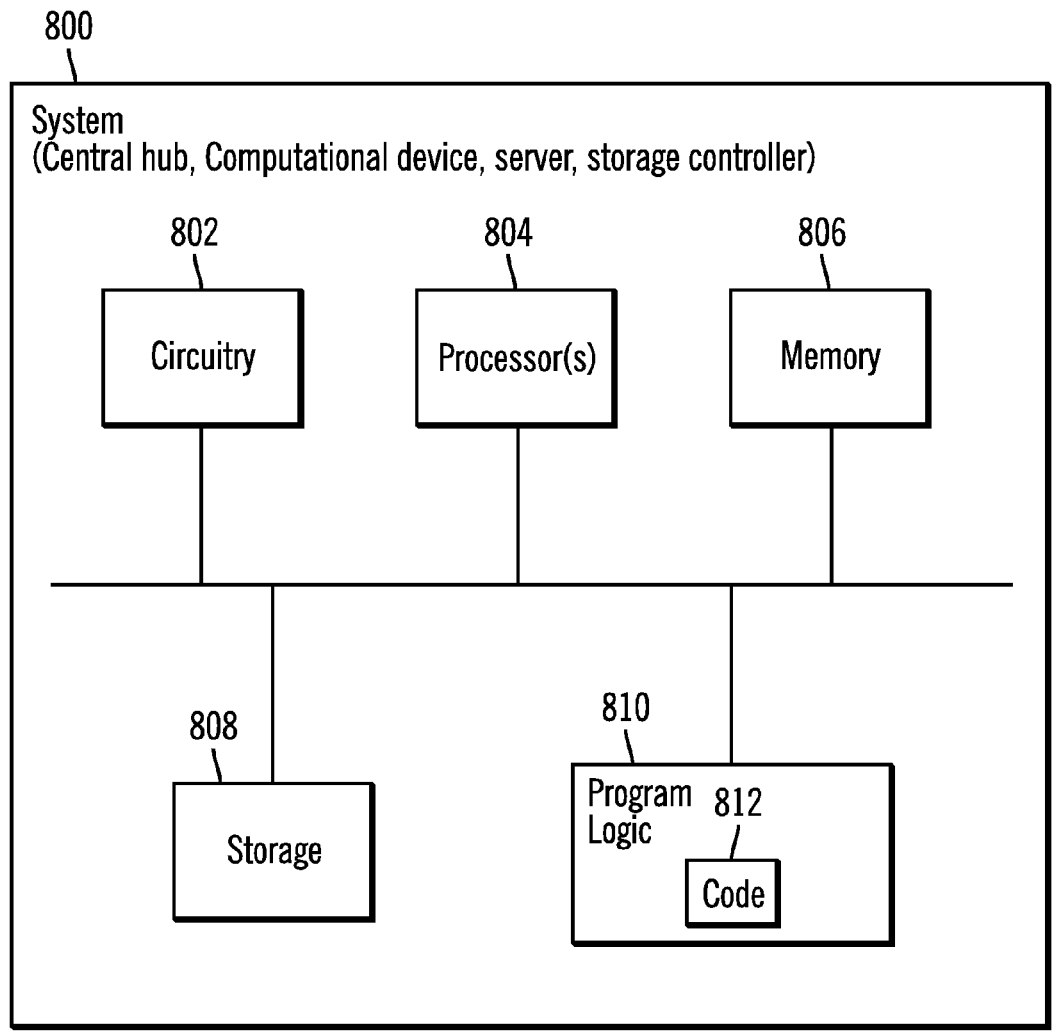
FIG. 8 illustrates a block diagram that shows certain elements that may be included in the computational devices and the central hub of the computing environment of FIG. 1, in accordance with certain embodiments.

FIG. 8 illustrates a block diagram that shows certain elements that may be included in the computational devices 102, 104, 106, 108 and the central hub 110 of the computing environment of FIG. 1, in accordance with certain embodiments. One or more of the computational devices 102 either individually or collectively may also be referred to as a system 800, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

*z/OS is a trademark or a registered trademark of IBM corporation.

What is claimed is:

1. A method comprising:
   numbering a plurality of computational devices sequentially with ordinal numbers at initialization time; and
   determining a selected computational device of the plurality of computational devices to be a manager system, wherein the determining of the manager system further comprises:
   determining which operational computational device of the plurality of computational devices has been numbered with a minimum ordinal number, and
   selecting the manager system to be the determined operational computational device that has been numbered with the minimum ordinal number, and wherein the method further comprises:
   maintaining locally for each of the plurality of computational devices, those locks that are held by the computational device in a data structure that grants locks for accessing common data stored at a central hub; and
   in response to a failure of the data structure, performing the determining of the selected computational device of the plurality of computational devices to be the manager system.

2. The method of claim 1, wherein the common data is shared by the plurality of computational devices.

3. The method of claim 1, wherein in response to the failure of the data structure maintained at the central hub, further performing:
   communicating to the manager system, by other computational devices besides the manager system, all locks held by the other computational devices in the data structure maintained at the central hub.

4. The method of claim 3, the method further comprising:
   performing transactions with respect to the data structure maintained at the manager system, until the data structure maintained at the central hub is operational.

5. A system, comprising:
   a memory; and
   a processor coupled to the memory, wherein the processor performs operations, the operations comprising:
   numbering a plurality of computational devices sequentially with ordinal numbers at initialization time; and determining a selected computational device of the plurality of computational devices to be a manager system, wherein the determining of the manager system further comprises:

determining which operational computational device of the plurality of computational devices has been numbered with a minimum ordinal number, and selecting the manager system to be the determined operational computational device that has been numbered with the minimum ordinal number, and wherein the operations further comprise:

maintaining locally for each of the plurality of computational devices, those locks that are held by the computational device in a data structure that grants locks for accessing common data stored at a central hub; and in response to a failure of the data structure, performing the determining of the selected computational device of the plurality of computational devices to be the manager system.

6. The system of claim 5, wherein the common data is shared by the plurality of computational devices.

7. The system of claim 5, wherein in response to the failure of the data structure maintained at the central hub, further performing:

communicating to the manager system, by other computational devices besides the manager system, all locks held by the other computational devices in the data structure maintained at the central hub.

8. The system of claim 7, the operations further comprising:

performing transactions with respect to the data structure maintained at the manager system, until the data structure maintained at the central hub is operational.

9. A computer readable storage medium that is selected from a group consisting of a magnetic storage, an optical storage, a volatile memory device and a non-volatile memory device, wherein code stored in the computer readable storage medium when executed by a processor causes operations, the operations comprising:

numbering a plurality of computational devices sequentially with ordinal numbers at initialization time; and determining a selected computational device of the plurality of computational devices to be a manager system, wherein the determining of the manager system further comprises:

determining which operational computational device of the plurality of computational devices has been numbered with a minimum ordinal number, and selecting the manager system to be the determined operational computational device that has been numbered with the minimum ordinal number, and wherein the operations further comprise:

maintaining locally for each of the plurality of computational devices, those locks that are held by the computational device in a data structure that grants locks for accessing common data stored at a central hub; and in response to a failure of the data structure, performing the determining of the selected computational device of the plurality of computational devices to be the manager system.

10. The computer readable storage medium of claim 9, wherein the common data is shared by the plurality of computational devices.

11. The computer readable storage medium of claim 9, wherein in response to the failure of the data structure maintained at the central hub, further performing:

communicating to the manager system, by other computational devices besides the manager system, all locks held by the other computational devices in the data structure maintained at the central hub.

12. The computer readable storage medium of claim 11, the operations further comprising:

performing transactions with respect to the data structure maintained at the manager system, until the data structure maintained at the central hub is operational.

* * * * *